April 9, 1935.  J. F. PALMER  1,997,389
INSULATING MATERIAL
Filed Nov. 25, 1932   3 Sheets-Sheet 1
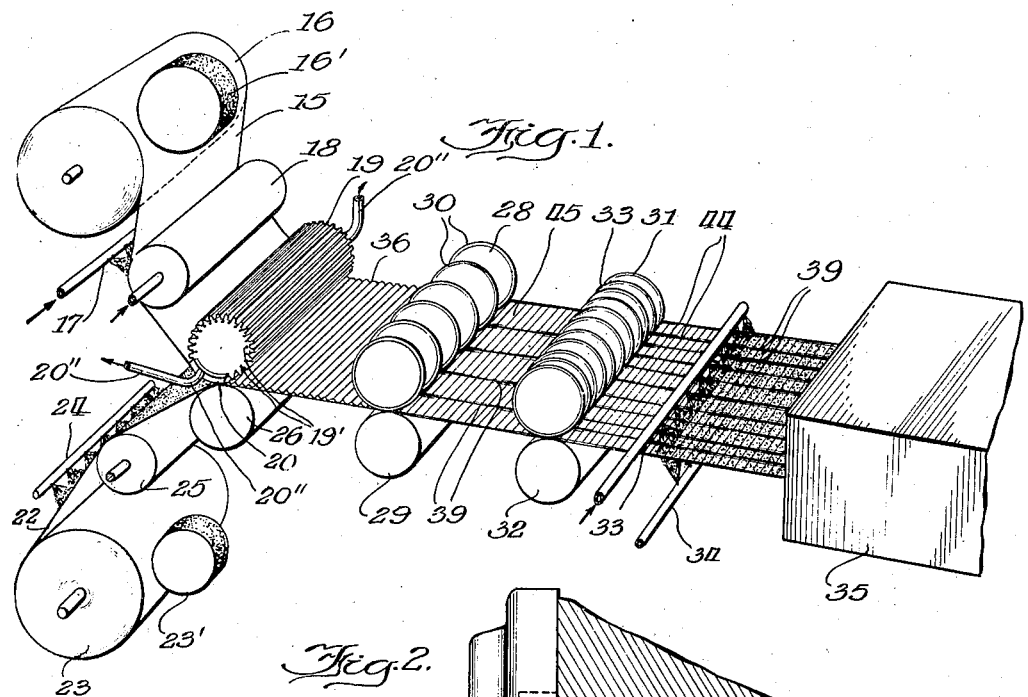
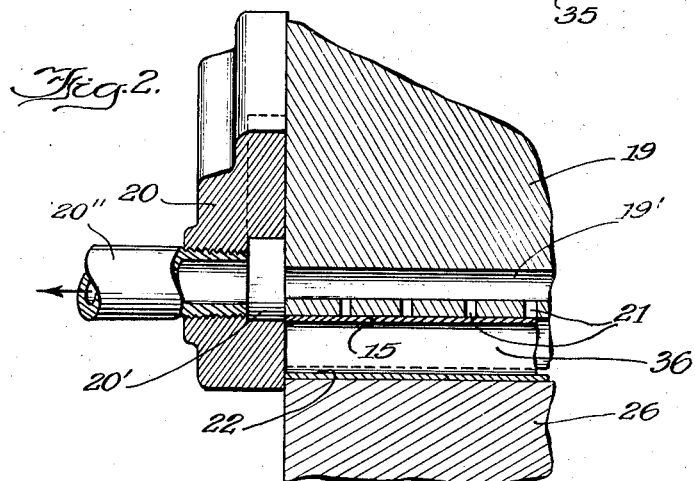
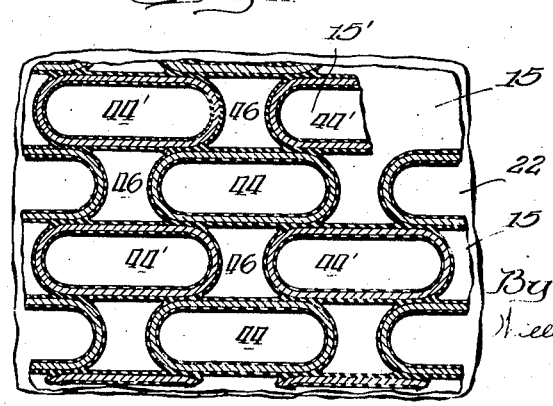
Inventor:
John F. Palmer
By Williams, Bradbury, McCaleb & Hinkle
Attys.

April 9, 1935.  J. F. PALMER  1,997,389
INSULATING MATERIAL
Filed Nov. 25, 1932   3 Sheets-Sheet 2

Inventor:
John F. Palmer
By

April 9, 1935.　　　J. F. PALMER　　　1,997,389
INSULATING MATERIAL
Filed Nov. 25, 1932　　　3 Sheets-Sheet 3
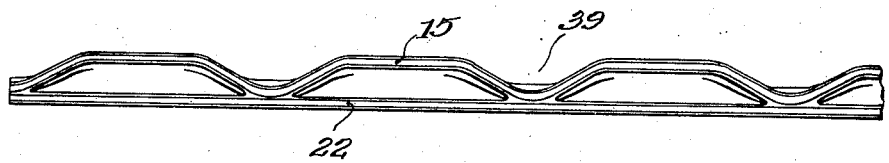
Fig. 7.
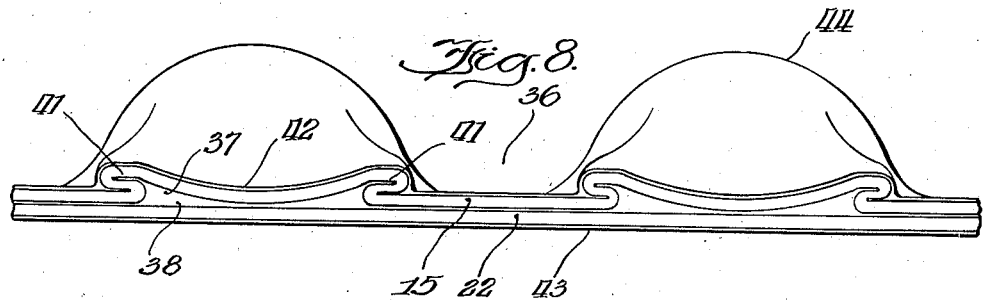
Fig. 8.
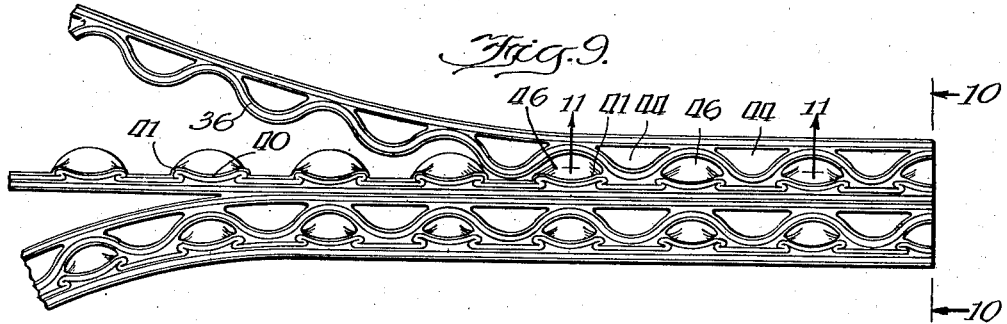
Fig. 9.
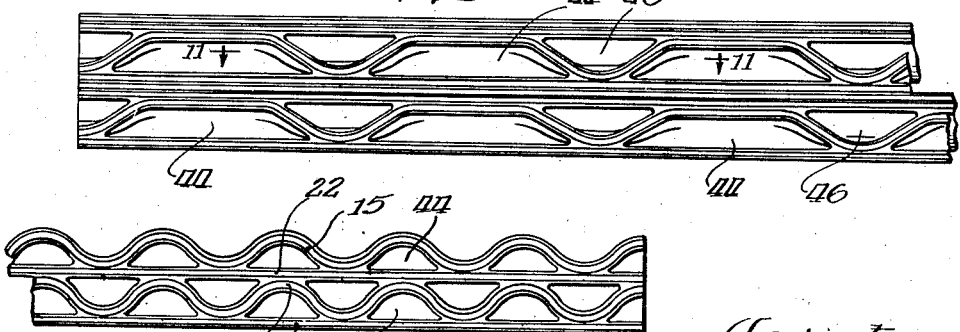
Fig. 10.
Fig. 12.
Inventor:
John F. Palmer
By
Williams, Bradbury, McCaul & Hinkle
Attys Patented Apr. 9, 1935

1,997,389

UNITED STATES PATENT OFFICE 1,997,389

INSULATING MATERIAL

John F. Palmer, St. Joseph, Mich.

Application November 25, 1932, Serial No. 644,195

19 Claims. (Cl. 154—45)

My invention relates to insulating material. More particularly my invention contemplates the fabrication of a multiplicity of cells of rubber which is substantially impervious to the passage of moisture, air or other gases, particularly such as might be encountered in refrigerators or the like. I am enabled to obtain a cellular structure formed of rubber which will have the necessary rigidity and resistance to distortion or collapse, and am also enabled conveniently and economically to fabricate such a structure by the use of a base or skeleton which is coated with the rubber.

For example, by selection of unsized kraft paper and by spraying it with latex, in fluid condition, the rubber of the latex compound will be deposited upon the kraft paper, and a portion, at least, of the moisture content will be readily absorbed by the paper and may be eliminated by a suitable dehydrating or drying treatment. Other methods, however, of applying the rubber for the cell walls are available, as will be more fully pointed out hereinafter. Also, I point out in detail below the process by which my insulating material is completed.

My insulating material has been devised with refrigerator insulation especially in mind, although it is by no means limited to that use.

Among the further objects of my invention are:

The elimination of "moisture migration" which is a serious objection in insulating materials. Atmospheric moisture and moisture from the contents of a refrigerator is gradually absorbed by unprotected insulation. As determined by gravitation and also by the coldest regions where condensation is greatest, the moisture migrates and collects in certain regions—in refrigerators generally near the bottom edges of side wall insulation. Here the insulation becomes soggy and musty and deteriorates. This moisture migration I eliminate by coating the paper frame or skeleton with latex. The latex coating is both waterproof and gas proof—particularly as to sulphur dioxide and methyl chloride and other common refrigerants. Preferably also the material is rendered non-conducive to vegetable or animal growth. These objects are preferably secured by coating the paper sheets constituting the insulating material with latex. While the primary purpose of the film or coating of rubber carried by the paper frame or skeleton is to form sealed rubber cells, it is an incidental but still very important result that there is a moisture impervious barrier formed by the rubber between each sheet or ply of paper at the points or regions where they are adhered together or lie together. This barrier prevents the migration of moisture from one paper sheet to another.

The elimination of separate coating materials and adhesive materials. This object I preferably secure by the use of a material such as latex which has the multiple function of moisture proofing, gas proofing, preserving and rendering the paper adhesive.

Incorporating in the insulating material a multiplicity of small sealed air cells. In certain types of corrugated paper insulation heretofore proposed, the corrugations even if succeessfully sealed at their ends would be of considerable length. The cells being so relatively large, they are subject to considerable convection currents of the air therewithin. My sealed cells on the other hand are relatively small, and therefore intra-cellular air currents are correspondingly reduced, and the insulating characteristic greatly enhanced.

A multi-cellular insulating sheet whose surface can be internested with the corresponding surface of another similar sheet, and especially where such internesting provides an additional set of sealed cells.

The foregoing, together with further objects, features and advantages of my invention are set forth in the following description of specific embodiments thereof and illustrated in the accompanying drawings, wherein:

Fig. 1 is a schematic perspective view of an apparatus for producing the insulating material of my invention;

Fig. 2 is a fragmentary detailed section illustrating the apparatus for applying suction to the corrugations of the corrugating roll to corrugated paper pneumatically;

Fig. 7 is an edge elevation of the piece of Fig. 4 looking along the line 7—7 of Fig. 4 and simulating a cross section along a primary or transverse corrugation at the ridge thereof;

Fig. 8 is an edge elevation of the piece of Fig. 4 looking along the line 8—8 of Fig. 4 and simulating a cross section along a longitudinal or second corrugation at the valley thereof;

Fig. 9 is an edge elevation of a block of multicellular sheets, showing how two cellular sheets are internested to form a double sheet and the double sheets are combined to form a block of insulation;

Fig. 10 is another elevation of the block of Fig. 9 looking in the direction of the arrows 10—10;

Figure 3:
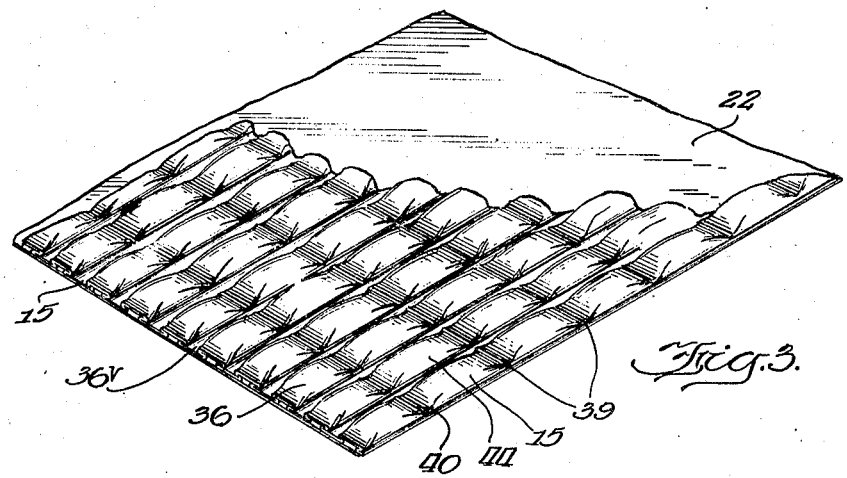
Fig. 3 is a perspective view of the corrugated side of a piece of a cellular sheet.

Fig. 11 is a plan section taken on the lines 11—11 of Figs. 9 and 10 to show the relative disposition of the air cells in the multi-cellular sheets and the third set of cells formed when two such sheets are internested as in Figs. 9 and 10; and Fig. 12 is an edge elevation of another block of insulation wherein the internested or double cellular sheets are assembled in a different relation to build up the block.

As an aid to understanding the structure of my insulating material, I shall first briefly describe a method and apparatus whereby it may be produced. The apparatus schematically indicated in Fig. 1 will produce a continuous cellular sheet formed of two plies of paper. Kraft paper is suitable for the purpose.

For the purpose of illustration, in Fig. 1 I have disregarded proportions, reference being made to Figs. 3 to 11 inclusive therefor.

An upper paper sheet 15 is fed from a supply roll 16 by a friction faced feed wheel 16'. The underside of the sheet is coated with a thin film of latex from a spray 17. This may be latex as it comes from the rubber tree concentrated to a one-third rubber content plus a preservative, if desired, but with rubber still in a colloidal form. The excess water content or "surface moisture" of the latex is largely absorbed by the uncoated kraft paper. This absorbs water content and the remaining excess water content is evaporated by a drying roll 18 contacting the upper side of the sheet.

The sheet 15 is then engaged by a corrugating roll 19 whose corrugations run longitudinally of the roll and transversely of the paper. For bringing the paper into the corrugations of the roll 19 I prefer suction rather than positive pressure or a mating corrugated roll. For corrugating by suction, an air passage 19' extends longitudinally of the corrugating roll 19 just radially inwardly from the bottom of each corrugation. A stationary arcuate plate 20 slidingly contacts each end face of the roll 19. It has a manifold-like channel 20' which at any moment engages the ends of the several passages 19' which correspond to the corrugations which are at that time in contact with the paper. At intervals cross ducts 21 communicate between each passage 19' and the bottom of the corresponding corrugation. Suction is applied to the corrugation bottoms by the cross ducts 21, the passages 19', the channels 20' and the suction pipes 20". The bottoms and sides of each corrugation, the end plates 20 and the paper sheet 15 combine to form a closed tubular chamber. This chamber being subjected to suction, the paper is sucked up against the bottom of the corrugation. While the drying roll 18 has eliminated the surface moisture from the latex coating, the paper has been rendered moist and warm. The moist paper is better adapted for distortion by the corrugating roll. The melting point of rubber being about 248° F., the roll 18 should not be so hot as to subject the rubber film to that high a temperature.

In the meantime a second or backing sheet 22 has been fed from a supply 23, similarly sprayed with latex on its upper side by the spray 24, dried by the drying roll 25 and brought over a platen roll 26 immediately beneath the corrugating roll 19. The mating rolls 26 and 19 press the backing sheet 22 against the upper sheet 15 as it is corrugated, and the two are secured together by the adhesiveness of their latex coatings. The backing sheet 22 is fed by a friction faced feed roller 23' similar to the feed roller 16' for the upper sheet except the latter is larger in diameter. The rolls 19 and 26 together with the feed rolls 16' and 23' may be driven synchronously and at the same R. P. M., the larger diameter of the feed roll 17 taking care of the additional length of paper required for the sheet 15 because of its being corrugated.

As the two-ply sheet is passed from the rolls 19 and 26, it consists of the backing sheet 22 untreated on its underside and latex coated on its upper side, and the corrugated upper sheet 15 superposed thereon. The corrugated sheet is latex coated on its under side but not on its upper side. The outer sides of the two-ply sheet are thus non-sticky, and can be engaged by additional rolls for further operations without complications of working with tacky surfaces. The upper or corrugated sheet is adhered to the backing sheet along the bottoms of the corrugations by means of the latex coatings.

This two-ply transversely corrugated sheet is then engaged by a second set of rolls 28 and 29. The lower roll 29 is a plain platen roll. The upper roll 28 is circumferentially beaded or ridged at intervals as indicated at 30. The beads 30 of the roll 28, working against the roll 29, form spaced longitudinal corrugations in the paper at right angles to the previously formed transverse corrugations. A bead is arranged at each end of the roll 28, so that the ends of the primary or transverse corrugations are sealed. The two-ply corrugated sheet is then engaged by a second set of longitudinally corrugating rolls 31 and 32, the roll 31 having a larger number of circumferential beads 33 than there are circumferential beads 30 on the roll 28. Preferably the number of beads 33 is a multiple of the number of beads 30 and preferably also certain of the beads 33 track the corrugations made by the beads 30.

The reason for effecting the secondary or longitudinal corrugations in two steps and for the above mentioned relation between the beads 30 and 33 will presently be described.

As the two-ply sheet passes from the rollers 31 and 32, its top is somewhat waffle-shaped or more precisely waffle iron-shaped, while the back or underside is substantially flat. Both sides are then coated with latex by sprays 33 and 34 whence they are passed into a long drying chamber 35.

Figure 4:
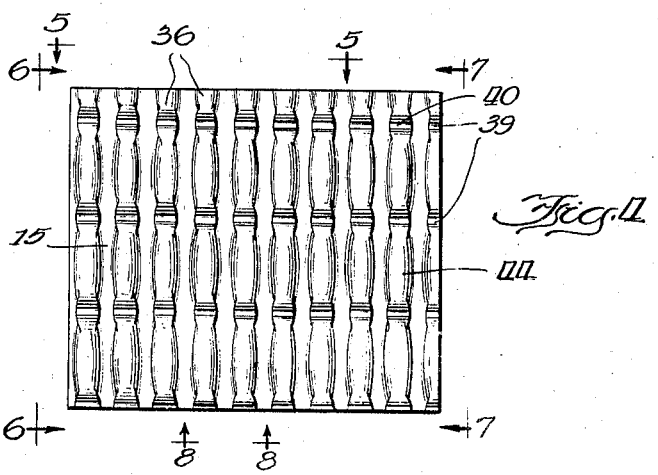
Fig. 4 is a plan view of the corrugated side of a small piece of multi-cellular sheet similar to that shown in Fig. 3, the respective edges of the sheet having been cut at various positions in respect to the corrugations, whereby the several edge elevations correspond to various sections and the confusion of cross section lines in indicating typical cross sections is thus avoided.
Figure 5:
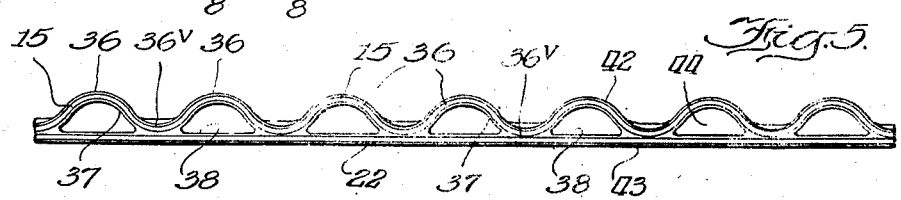
Fig. 5 is an edge elevation of the piece of Fig. 4 looking along the line 5—5 of Fig. 4 and simulating a cross section across the primary or transverse corrugations and intermediate the secondary or longitudinal corrugations.
Figure 6:
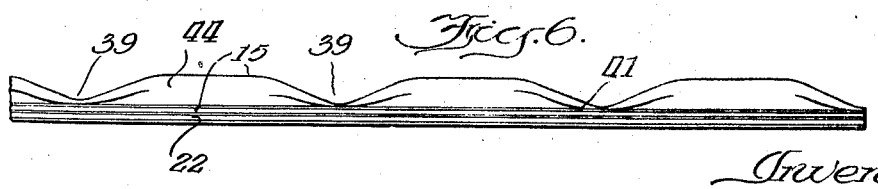
Fig. 6 is an edge elevation of the piece of Fig. 4 looking along the line 6—6 of Fig. 4 and simulating a cross section parallel with the primary or transverse corrugations and at the valley thereof.

As it emerges from the drying chamber the cellular sheet may be cut to convenient lengths, and then appears as illustrated in Figs. 3 and 4 as supplemented by the cross sections of Figs. 5, 6, 7 and 8.

The lower sheet 22 is substantially flat. The upper sheet 15 has primary or transverse corrugations 36 whose bottoms or valleys 36V are adhered to the back sheet 22 by the undercoating of latex rubber 37 on the sheet 15 and the upper coating 38 of latex rubber on the backing sheet 22. Superposed upon these transverse corrugations 36 are the secondary or longitudinal corrugations 39 effected by the beads 30 and 33 of the rolls 28 and 31.

Because the longitudinal corrugations 39 are made subsequent to the transverse corrugations 36, the result is one of crushing down the transverse corrugations 36 at the intersections 40 so that the cross section as seen in Fig. 8, for example, is like that of a box pleat. The folds 41 are the result of the upper sheet 15 being of greater length than the backing sheet 22. The top surface of the upper sheet 15 carries a coating of latex rubber 42 while the bottom of the back sheet 22 carries a coating 43 of latex rubber.

If, in the production of my cellular sheet as previously described, the rollers 28 and 29 were omitted and all of the longitudinal corrugations 39 were formed simultaneously, the result would not be so desirable. The formation of the longitudinal corrugations 39 considerably reduces the volume of the open-ended tubes initially formed by the transverse corrugations 36 and the backing sheet 22. If all of the longitudinal corrugations are formed simultaneously, the volume of each open-ended corrugation tube is decreased by increments as the roll 31 passes over the corrugated sheet. Air within the tube displaced by this ensmalling of the volume passes out the ends. By the time the air cells 44 are sealed so that no more air can pass out the ends of the corrugation, the ensmalling of the volume has been substantially completed. The air trapped in the cells is at substantially atmospheric pressure at the moment. If the air has been above room temperature as a result of heat transfer held over by the sheet from the drying roll 18, the air may soon contract slightly, putting the cell under slight suction. In either case the cell is not as resistant to collapsing as though air under slight pressure be trapped within it. It is chiefly for this reason that I prefer first to seal the ends of the primary corrugations 36 against the loss of air before subdividing the corrugations into the cells.

If I were to employ only the end beads 30 on the first longitudinal roll 28, it would mean that all of the air thus sealed within the full volume of each tube formed by a transverse corrugation 36 would have to be distributed, as a result of the action of the roller 31, among the several cells of the transverse corrugation. Because of the ensmalling effect of the longitudinal corrugations 39 on the volume of the transverse corrugation tube, the aggregate volumes of the air cells 44 in any transverse corrugation 36 is considerably less than the original volume of the corrugation 2. As a result the pressure would be dangerously increased in the respective cells 44. There is a practical limit to the internal air pressure for any individual cell 44. If it is too high the cell will be ruptured, most probably by tearing loose the seal afforded by the latex rubber adhesion. The maximum practical internal pressure for the cell is dependent on many factors, such as the strength of the paper, the stickiness of the latex, the area of the seal as effected by the transverse and longitudinal corrugations, etc. By initially subdividing the transverse corrugations 36 into a plurality of sub-tubes 45 by the first longitudinal corrugating roll 28, I secure sealed sub-tubes whose internal pressure is substantially atmospheric pressure. This is because the sub-tubes 45 (Fig. 1) are formed simultaneously and sealed by increments, so that the air displaced by the decreasing volume continues to pass out the end of the transverse corrugations 36 until the sub-tubes 45 are completely sealed.

Then by subdividing the sub-tubes 45 into still smaller divisions or cells 44, I can raise the internal air pressure of the individual air cells 44 considerably above atmospheric pressure, but still not high enough to rupture the seal of the cells.

The superatmospheric internal pressure of the cells 44 tends to hold them in puffed out position and resists collapsing by pressures incidental to handling or assembling. A more immediate advantage of the internal pressure in the cells is that they hold the corrugated walls of the cells in position while the paper is still moist from the latex spray, so that the paper dries in the proper shape.

I find that when using relatively light kraft paper and latex as described, where the primary or transverse corrugations run thirty-six to the foot, satisfactory results are obtained by placing the beads 30 on the first longitudinal corrugated roll 28 one and one-half inches apart and using twice as many annular beads 33 on the second corrugating roll 31 so that in the finished cellular sheet the longitudinal corrugations are three-fourths of an inch apart.

Using the multi-cellular sheet of Fig. 3 as a unit, a plurality of such sheets may be assembled in any one of a number of relations to build the desired over-all thickness. For greatest insulation value per inch of thickness of material, I prefer the assembly relation shown in Fig. 9. In this the corrugated faces of two multicellular sheets are placed together in internesting relation. The primary or transverse corrugations 36 of the upper multi-cellular sheet of a pair run parallel with those of the lower multi-cellular sheet, but the sheets are offset longitudinally one-half of the distance between corrugations 36 so that the ridges of the corrugations 36 on the upper sheet come in the valleys of the corrugations 36 of the lower sheet, and vice versa. The upper cellular sheet is also offset transversely relatively to the lower multi-cellular sheet by a distance equal to one-half of the distance between the longitudinal corrugations 39, as shown in Fig. 10. This results in a third set of transversely (I use the terms transverse and longitudinally as they were used in connection with Fig. 1) disposed cells 46. I might explain that if the transverse corrugations 36 only were used and there were no longitudinal corrugations 39, and the sheets were thus assembled, the corrugations would simply internest and there would be no third set of cells formed. The third set of cells 46 is formed as a result of the longitudinal corrugations 39 and in general the aggregate volume of the third set of cells 46 is equal to the aggregate volumetric decrease in the corrugations 36 resulting from the longitudinal corrugations 39. Thus while the use of the longitudinal corrugations 39 in subdividing the corrugations 36 reduces the aggregate cellular volume as far as the multi-cellular sheet itself is concerned, when two of these sheets are combined as illustrated in Fig. 9, the lost volume is replaced, taking the form of the third set of cells 46.

As a matter of three dimensional geometry the outer conformations of the cells 44, when assembled as in Fig. 9, will result in the third set of cells 46 being substantially non-communicating. The coatings 42 of sticky rubber serve to compensate for any inaccuracies of the internesting fit and to seal the third set of cells 46 from one another. This seal may be made still more perfect by placing the internested pair of multi-cellular cells between two parallel hot sheets which are spaced apart a distance equal to the thickness of the pair of internested cellular sheets. The heat of the plates will raise the temperature of the air trapped within the several cells and press their walls tightly together. This being done by internal pressure and not external pressure, there is no tendency to collapse the cells nor to lessen the thickness of the double sheet. It does, however, effect a better adhesion between the mating surfaces of the upper and lower cellular sheets and thereby better insures that the third set of cells 46 is substantially sealed against intercommunication and hence against transmission of heat by convection currents of air.

After the multi-cellular sheets have been internested in pairs to form double units, the double units have substantially flat exposed surfaces represented by the respective backing sheets 22. Two or more of these double units may be superposed as shown in Fig. 9. A block may be built up to any desired thickness, the assembly being maintained by the adhesiveness of the rubber coatings 43 on the backing sheets 22.

In Fig. 11 I have shown another way of assembling the multi-cellular sheets of Fig. 3. The corrugated sides are not internested in pairs, but instead the backing sheet 22 of one is laid upon the corrugated side of another sheet. In this way a block of any desired thickness may also be built up. I do not limit myself however to either of these two specific assemblies of the sheet of Fig. 3 into thicker blocks.

In practice when making sections or blocks of insulation for refrigerator walls, the continuous multi-cellular sheet discharged from the apparatus of Fig. 1 may be cut into pieces of approximately the area of the desired section and the assembly indicated in Figs. 9 and 10 may be made with multi-cellular sheets of that size. When assembled to the desired thickness, the section may be trimmed as with a rotary knife. If desired the section may be wrapped with plain or latex coated paper before being set into position in the refrigerator wall. If the assembly shown in Figs. 9 and 10 be used, it is unnecessary to seal the edges of the section, and the paper wrapping is not necessary. If the section is not to be wrapped the outer surfaces may be dusted with talc to facilitate handling.

I prefer, however, to spray with latex the entire exposed surface of a block of insulation material after the respective multicellular sheets have been assembled, but before it is wrapped if it is to be wrapped. In this way I positively seal the block against the ingress or egress of moisture, air, gases, or odors even though there be unsealed interstices left especially between the backing plies of the multi-cellular sheets.

I contemplate that materials other than latex may be used for the coatings herein described. I prefer to use latex for a number of reasons: It may be applied cold. It may be sprayed. The rubber is not affected by heat under 248° F. making possible the use of steam heat in drying. This makes possible the use of my material in industrial insulating applications where temperatures would melt wax compounds for example. The insulation will not be deteriorated even by coming in contact with live steam. The rubber coating being unvulcanized, I take advantage of the remarkable stability of unvulcanized rubber as against the action of time, moisture, light, heat (within the limit specified), and most gases. Unlike vulcanized rubber, it is odorless. It contains no sulphur or other ingredient which might affect metal parts with which it comes in contact. It not only coats the paper but to an extent impregnates the fibers. It is not conducive to mold or other fungus growths. The rubber is a good heat insulator. Its electrical insulating qualities make my insulation of advantage in heat insulating where poorly insulated electrical conductors are passed through it.

The several latex coatings 37, 38, 42 and 43 are initially adhesive and retain their tackiness for at least several weeks. This permits the consummation of all assembly operations within a reasonable time while still having the advantage of the adhesive qualities of the rubber coating. In the course of time by incidental exposure the superficial surface of the coating will lose its tackiness, which is an advantage. However the rubber is not vulcanized and therefore will not deteriorate even on exposure to light.

While the rubber coating may be applied as a solution or as a calendered sheet, it is a feature of my invention that the rubber is applied as a spray or dip of latex wherein the rubber is in its natural colloidal suspension. This is more satisfactory and produces a better result than treating the paper with a form of rubber which has previously been chemically coagulated to separate it from the water content of the latex or where the rubber has previously been substantially dried.

While I have disclosed these specific embodiments of my invention, I contemplate that substitutions and changes may be made without departing from the scope of my invention. For assembly, instead of starting with plain sheets of paper and using the latex to adhere the corrugated sheet to the base sheet, one may start with commercial corrugated paper consisting of a base sheet and a corrugated sheet adhered together by the conventional silicate of soda. This corrugated sheet and backing may be dipped or otherwise coated with latex so that the inner surfaces of the tubes of the corrugations are treated, whereupon the longitudinal corrugations may be effected. The methods I have herein disclosed may be carried on more largely as hand operations, if desired. Instead of a continuous manufacture, lengths of sheets may be fed by hand to the corrugators. Also, instead of using a backing sheet which is flat, I may use one which is corrugated like the top sheet, so that the two sheets or plies constituting the multi-cellular sheet are duplicates and arranged with their low regions adhered together. In such case the cells are of substantially twice the volume and both sides of the multi-cellular sheet present corrugated surfaces which may be internested as previously described to build up blocks.

I claim:

1. A multiplicity of rubber envelopes each defining an air cell therewithin and a paper frame to which the envelopes are fixedly held in assembled relation.

2. A multiplicity of rubber envelopes each defining an air cell therewithin and a paper frame substantially surrounding each envelope and between it and its adjacent envelopes.

3. An insulating material comprising a multiplicity of paper-framed rubber envelopes constituting a series of air cells.

4. An insulating material comprising a multiplicity of envelopes of unvulcanized rubber constituting a series of air cells, each envelope being framed by stiffer material than the rubber lining the envelope.

5. An insulating material comprising a multiplicity of rubber envelopes constituting a series of air cells, the envelopes being interfitted to form a further or secondary series of air cells.

6. An insulating material comprising a multiplicity of contiguously arranged rubber envelopes, each constituting an air cell, with non-communicating interstices therebetween, each envelope being framed by sheet material.

7. A multi-tubular insulating sheet comprising a pair of paper plies, one of which is corrugated and superposed on the other to form a multiplicity of tubes, and a rubber lining for each tube.

8. A fabricated insulating material comprising rubber coated corrugated sheets in superposed assembly, the sheets being moistureproofed by, and adhered to one another in assembled relation by, the rubber coatings.

9. A cellular insulation comprising in combination sheets of material arranged to form air cells therebetween, and rubber coatings on the surfaces of the sheets for adhering them together in such arrangement; and constituting a rubber lining for each cell.

10. A multi-cellular insulating sheet comprising paper plies forming cells therebetween and a rubber film lining for each cell.

11. A multi-cellular insulating sheet comprising in combination a paper base ply, a corrugated ply thereon, and a coating of rubber on both plies on the sides thereof facing each other ply and adhering the two plies together.

12. A multi-cellular insulating sheet comprising two plies of paper adhered together with air cells therebetween, the air in the cells being under positive pressure.

13. An insulating sheet comprising a backing ply of paper and a corrugated ply of paper, the corrugated ply being corrugated both lengthwise and crosswise with the low regions of the corrugated ply sealed to the backing ply to form closed cells, and confined air within the cells under positive pressure.

14. An insulating material comprising a pair of multi-cellular sheets, each sheeet comprising a backing ply and a corrugated ply adhered thereto, the corrugated ply having a series of parallel primary corrugations therein and a series of secondary corrugations imposed transversely upon the primary corrugations and subdividing the latter into a multiplicity of air cells bounded by the backing ply and the corrugated ply, the two sheets being assembled with their corrugated sides together, the primary corrugations of one sheet being offset relatively to those of the other sheet and the secondary corrugations of one sheet being offset relatively to those of the other sheet whereby the corrugations of the respective sheets internest to form a third series of cells each cell of which is bounded by both corrugated plies.

15. An insulating material comprising a pair of multi-cellular sheets, each sheet comprising a backing ply and a corrugated ply adhered thereto, the corrugated ply having a series of parallel primary corrugations therein and a series of secondary corrugations imposed transversely upon the primary corrugations and subdividing the latter into a multiplicity of air cells bounded by the backing ply and the corrugated ply, the two sheets being assembled with their corrugated sides together, the primary corrugations of one sheet being offset relatively to those of the other sheet whereby the corrugations of the respective sheets internest to form a third series of cells each cell of which is bounded by both corrugated plies.

16. An insulating material comprising a pair of multi-cellular sheets, each sheet comprising a backing ply and a corrugated ply adhered thereto, the corrugated ply having a series of parallel primary corrugations therein and a series of secondary corrugations imposed transversely upon the primary corrugations and subdividing the latter into a multiplicity of air cells, the two sheets being assembled with their corrugated sides together, the primary corrugations of one sheet being offset relatively to those of the other sheet whereby the corrugations of the respective sheets internest to form a third series of cells each cell of which is bounded by both corrugated plies.

17. An insulating material comprising a pair of multi-cellular sheets, each sheet comprising a backing ply and a corrugated ply adhered thereto, the corrugated ply having a series of parallel primary corrugations therein and a series of secondary corrugations imposed transversely upon the primary corrugations and subdividing the latter into a multiplicity of air cells, the two sheets being assembled with their corrugated sides together and forming between the corrugated plies a third series of air cells, each having a volume of the order of the volume of the first mentioned cells.

18. An insulating material comprising a pair of multi-cellular sheets, each sheet comprising a backing ply and a corrugated ply adhered thereto, the corrugated ply having a series of parallel primary corrugations therein and a series of secondary corrugations imposed transversely upon the primary corrugations and subdividing the latter into a multiplicity of air cells, the two sheets being assembled with their corrugated sides together and forming between the corrugated plies a third series of air cells each having a volume of the order of the volume of the first mentioned cells, the backing plies presenting substantially flat exposed surfaces.

19. A fabricated insulating unit comprising a plurality of laminations or layers, each lamination comprising a pair of sheets formed with a multiplicity of air cells therebetween, and a film of rubber between the laminations and extending over the area thereof, to check interlaminal migration of moisture, the laminations being adhered together as a unit.

JOHN F. PALMER.